(12) United States Patent
Hilpert

(10) Patent No.: US 7,958,729 B2
(45) Date of Patent: Jun. 14, 2011

(54) COMPRESSOR IN THE INTAKE TRACT OF AN INTERNAL COMBUSTION ENGINE

(75) Inventor: Thorsten Hilpert, Erdmannshausen (DE)

(73) Assignee: Mann + Hummel GmbH, Ludwigsburg (DE)

( * ) Notice: Subject to any disclaimer, the term of this patent is extended or adjusted under 35 U.S.C. 154(b) by 404 days.

(21) Appl. No.: 12/147,515

(22) Filed: Jun. 27, 2008

(65) Prior Publication Data
US 2009/0000300 A1    Jan. 1, 2009

(30) Foreign Application Priority Data
Jun. 28, 2007    (DE) .......................... 10 2007 030 277

(51) Int. Cl.
*F02B 33/44* (2006.01)

(52) U.S. Cl. ..................................................... 60/605.1

(58) Field of Classification Search .................. 60/605.1
See application file for complete search history.

(56) References Cited

U.S. PATENT DOCUMENTS

| 2,204,814 | A | * | 6/1940 | Newell ............................. 184/6 |
| 2,942,687 | A | * | 6/1960 | Kollander ....................... 60/311 |
| 3,686,831 | A | * | 8/1972 | Libby ............................. 96/174 |
| 5,554,343 | A | * | 9/1996 | Wade ............................ 422/177 |
| 2008/0028757 | A1 | * | 2/2008 | Eitel et al. ....................... 60/311 |

* cited by examiner

*Primary Examiner* — Thomas E Denion
*Assistant Examiner* — Mary A Davis

(57) ABSTRACT

A compressor in the intake tractate of an internal combustion engine has a compressor chamber and a compressor wheel arranged in the compressor chamber. A drive unit with shaft is provided, wherein the compressor wheel is coupled to the shaft. An intermediate chamber separate from the compressor chamber is provided. A centrifugal separator is arranged in the intermediate chamber and coupled to the shaft. The intermediate chamber has an inlet for supplying separator gases and also has at least one connecting opening that connects the intermediate chamber to the compressor chamber.

10 Claims, 2 Drawing Sheets

10

COMPRESSOR IN THE INTAKE TRACT OF AN INTERNAL COMBUSTION ENGINE

BACKGROUND OF THE INVENTION

The invention relates to a compressor in the intake tract of an internal combustion engine comprising a compressor wheel that is coupled to a shaft and arranged in a compressor chamber. The shaft is driven by a drive unit.

Exhaust gas turbochargers for internal combustion engines are known that comprise an exhaust gas turbine in the exhaust gas manifold of the internal combustion engine and a compressor in the intake tract. The turbine wheel of the exhaust gas turbine is driven by the pressurized exhaust gases and, in turn, drives by means of a shaft the compressor wheel. In this way, the combustion air is compressed to a higher pressure and supplied to the cylinders of the internal combustion engine. Coupling between the turbine wheel and the compressor wheel is realized by means of a shaft that is rotatably supported in a housing of the exhaust gas turbocharger.

Known are also charged internal combustion engines that have in the intake tract a compressor that is mechanically driven directly by the internal combustion engine. By means of the compressor an increase of the charge air pressure of the combustion air supplied to the cylinders is achieved.

Based on this known technology, the object of the invention is to provide a compressor in the intake tract of an internal combustion engine that can be used for additional applications.

SUMMARY OF THE INVENTION

In accordance with the present invention, this is achieved in that a centrifugal separator is integrated into the compressor which centrifugal separator is arranged in an intermediate chamber that is embodied separate from the compressor chamber and is coupled to the shaft, wherein the intermediate chamber has an inlet opening for supplying separator gases and communicates by means of at least one connecting opening with the compressor chamber.

The compressor according to the invention is located in the intake tract of an internal combustion engine and comprises a compressor wheel arranged in a compressor chamber. The compressor wheel is coupled to a shaft that is driven by a drive unit. According to the invention it is provided that a centrifugal separator is integrated into the compressor and the centrifugal separator is arranged in an intermediate chamber that is separate from the compressor chamber. The centrifugal separator is coupled to the shaft. The intermediate chamber has an inlet for supplying separator gases and communicates by at least one connecting opening with the compressor chamber.

The important advantage of the invention resides in that a separator for liquid or oil originating, for example, from the crankcase is integrated into the compressor and in that the separator gases are simultaneously supplied to the intake air via the compressor after separation of the liquid. By means of the invention a compact unit of compressor and centrifugal separator is provided. The centrifugal separator has as a result of the high rotary speed of the compressor a high performance and is therefore very effective. A further advantage is to be seen in that, as a whole, only a relatively small size for two separate functions is required; this represents a particularly economic solution. The separator can be integrated, if needed, into an already existing compressor.

Since the centrifugal separator is arranged in the separately embodied intermediate chamber into which the separator gases are introduced there is also no risk that the separator gases can be introduced directly without being purified into the combustion air stream and supplied to the cylinders. The gas stream of the separator gases can be controlled instead such that the gases introduced into the intermediate chamber are caused to rotate by the rotating centrifugal separator so that the liquid droplets contained in the gases are thrown by centrifugal force outwardly and will deposit on the inner wall of the intermediate chamber or any other component contained within the intermediate chamber. The separated liquid can be collected and discharged by means of a liquid outlet. The separation of the liquid droplets is realized in this connection preferably within the intermediate chamber by the centrifugal separator so that it is reliably ensured that only the purified gas stream can reach via the connecting opening the compressor chamber and the compressor wheel arranged therein.

In an expedient embodiment the intermediate chamber is connected by means of the connecting opening to the intake side of the compressor wheel so that the existing suction or vacuum created by the compressor wheel is utilized for conveying the purified gases from the intermediate chamber into the compressor chamber. In principle, a transfer at other positions is possible also as long as it is ensured that, as a result of the pressure build-up produced by the rotating centrifugal separator, a pressure differential exists relative to the compressor chamber which pressure differential enables flow of the purified gases through the connecting opening. For example, the connecting opening that is provided preferably in a wall of the intermediate chamber can pass into a connecting channel that opens at the compressor side either into the supply channel to the compressor wheel or into a diffusor by means of which the combustion air compressed by the compressor wheel is guided in the direction toward the internal combustion engine.

According to a further advantageous embodiment the connecting opening between the intermediate chamber and the compressor chamber and the inlet through which the separator gases are introduced into the intermediate chamber are arranged on opposite sides of the centrifugal separator in the walls of the intermediate chamber. By means of this arrangement, the pressure difference between the opposite sides of the centrifugal separator is utilized for taking in the separator gases, on the one hand, and for discharging the purified gases, on the other hand. In this connection it is expedient that the inlet into the intermediate chamber is positioned on the side of the centrifugal separator that is facing away from the compressor wheel so that the inlet is located at the vacuum side of the centrifugal separator and the connecting opening to the compressor chamber is located at the pressure side.

Moreover, it can be expedient that the inlet opens radially into the intermediate chamber and that the connecting opening extends in the axial direction. The radial position of the inlet enables an obstacle-free access to the intermediate chamber at a spacing to the components of the compressor or the assembly in which the compressor is integrated. The axial orientation of the connecting opening between intermediate chamber and compressor chamber assists the flow away from the pressure side of the centrifugal separator wherein at the same time it is ensured that as a result of the radial or tangential spinning-off action no liquid droplets will pass through the axial connecting opening into the compressor chamber.

In order to assist in the flow transfer of the purified gases from the intermediate chamber into the compressor chamber, it is possible to provide additional vanes on the centrifugal separator at the compressor side which vanes are provided for an additional pressure build-up on this side of the centrifugal separator and therefore enhance the flow into the compressor chamber. Advantageously, vanes are provided on the centrifugal separator also on the side facing away from the compressor wheel and, as is known in the art, cause rotation of the supplied gases.

According to a preferred embodiment, the compressor is part of an exhaust gas turbocharger for an internal combustion engine that, in addition to the compressor, also comprises an exhaust gas turbine whose turbine wheel in the exhaust gas manifold is driven by the pressurized exhaust gases of the internal combustion engine. The exhaust gas turbine thus provides the drive unit for the compressor. The shaft between turbine wheel and compressor wheel is at the same time a support of the centrifugal separator that is arranged in the axial direction between turbine wheel and compressor wheel in the turbine chamber. The intermediate chamber is therefore located between the turbine chamber and the compressor chamber wherein the walls of the intermediate chamber separate these chambers from one another. Turbine wheel, compressor wheel and centrifugal separator are preferably connected fixedly to the shaft and rotate at the same rotary speed.

According to a further embodiment the compressor is designed so as to be driven mechanically and/or electrically wherein in the case of mechanical drive action a drive connection to the crankshaft of the internal combustion engine or a component that is driven by the crankshaft is provided and, in the case of electric drive action, an electric motor is provided that drives the shaft of the compressor wheel. The connection to the crankshaft or the electric motor in this case provides the drive unit by means of which the compressor wheel and thus also the centrifugal separator are driven. The intermediate chamber adjoins immediately the compressor chamber and these two chambers form a common unit or a common housing.

DESCRIPTION OF THE PREFERRED EMBODIMENTS

Figure 1:
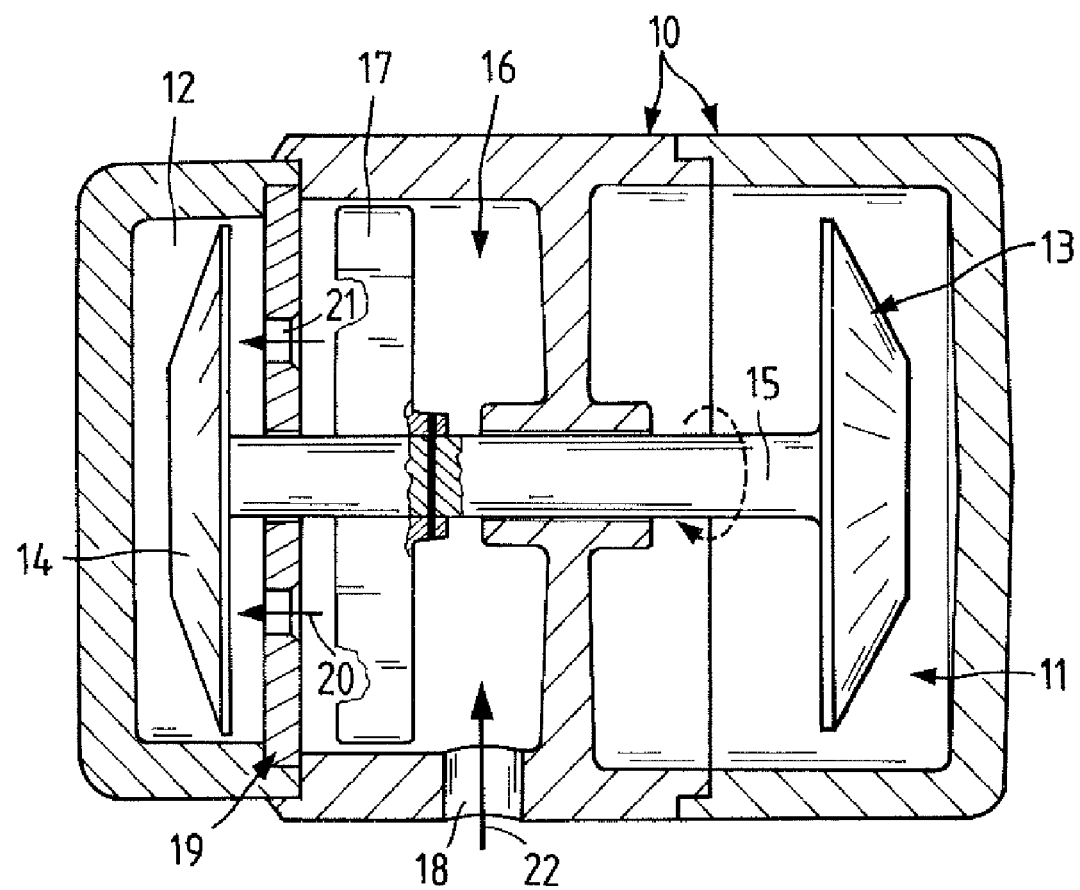
FIG. 1 is a schematic illustration of a turbocharger with implemented oil separator that is embodied as a centrifugal separator.

The exhaust gas turbocharger illustrated in FIG. 1 has a housing 10 that comprises substantially two chambers 11 and 12, wherein the chamber 11 is a turbine chamber for receiving a turbine wheel 13 and the chamber 12 is a compressor chamber for receiving a compressor wheel 14. The turbine wheel 13 and the compressor wheel 14 are coupled for common rotation by means of a common shaft 15 that is supported rotatably in the housing 10. As a result of the rotational coupling between the turbine wheel 13 and the compressor wheel 14, the wheels 13 and 14 have the same rotary speed upon rotation of the shaft 15.

The turbine wheel 13 is located in the exhaust gas manifold of an internal combustion engine and is driven by the pressurized gases of the internal combustion engine. The rotary movement of the turbine wheel 13 is transmitted by the shaft 15 onto the compressor wheel 14 that is located in the intake tract of the internal combustion engine and compresses the combustion air to an increased charge pressure at which pressure the combustion air is supplied to the cylinders of the internal combustion engine for supercharging.

Between the turbine chamber 11 and the compressor chamber 12 there is an intermediate chamber 16 in which a centrifugal separator 17 is arranged that is mounted on shaft 15 and fixedly connected to it. The centrifugal separator 17 rotates thus synchronously to the turbine wheel 13 and the compressor wheel 14. The intermediate chamber 16 forms together with the turbine chamber 11 and the compressor chamber 12 the housing of the exhaust gas turbocharger wherein a one-part configuration as well as a multi-part configuration of the chambers is possible.

The centrifugal separator 17 serves for separation of oil or liquid droplets in blow-by gases or crankshaft gases that are introduced as separator gases into the intermediate chamber 16. By rotation of the centrifugal separator 17 the separator gas contained in the intermediate chamber 16 is caused to rotate so that the liquid droplets by centrifugal forces are transported radially or tangentially outwardly and are deposited on the radial inner side of the intermediate chamber wall. From here a discharge of collected liquid droplets is possible, for example, by means of opening 18 provided in the wall of the intermediate chamber and opening radially into the intermediate chamber. This opening 18 serves primarily as the inlet for the supply of separator gases but can also be utilized for discharging collected oil droplets. In principle, it is also possible to discharge the collected oil droplets by means of a separate opening.

The separator gases that are introduced radially in the direction of arrow 22 through the inlet 18 into the intermediate chamber 16 are discharged after purification axially through the connecting openings 20 and 21 that are provided in the partition 19 between the intermediate chamber 16 and the compressor chamber 12. The purified gases are then introduced by the pressure difference between the side of the centrifugal separator 17 facing the partition 19 and the compressor chamber 12 into the latter wherein mixing with the combustion air supplied by means of the compressor wheel takes place and, after compression, a discharge in the direction of the cylinders of the internal combustion engine occurs.

A bearing location for the rotary bearing of the shaft 15 can be provided in the partition of the intermediate chamber 16 to the turbine chamber 11. A further bearing location can be provided in the partition 19 between the intermediate chamber 16 and the compressor chamber 12 that is also penetrated by the shaft 15. The bearing locations for the shaft 15 in the partitions between the intermediate chamber and the adjoining chambers on either side are preferably designed to be pressure-tight in order to prevent gas from passing through the bearing locations.

Figure 2:
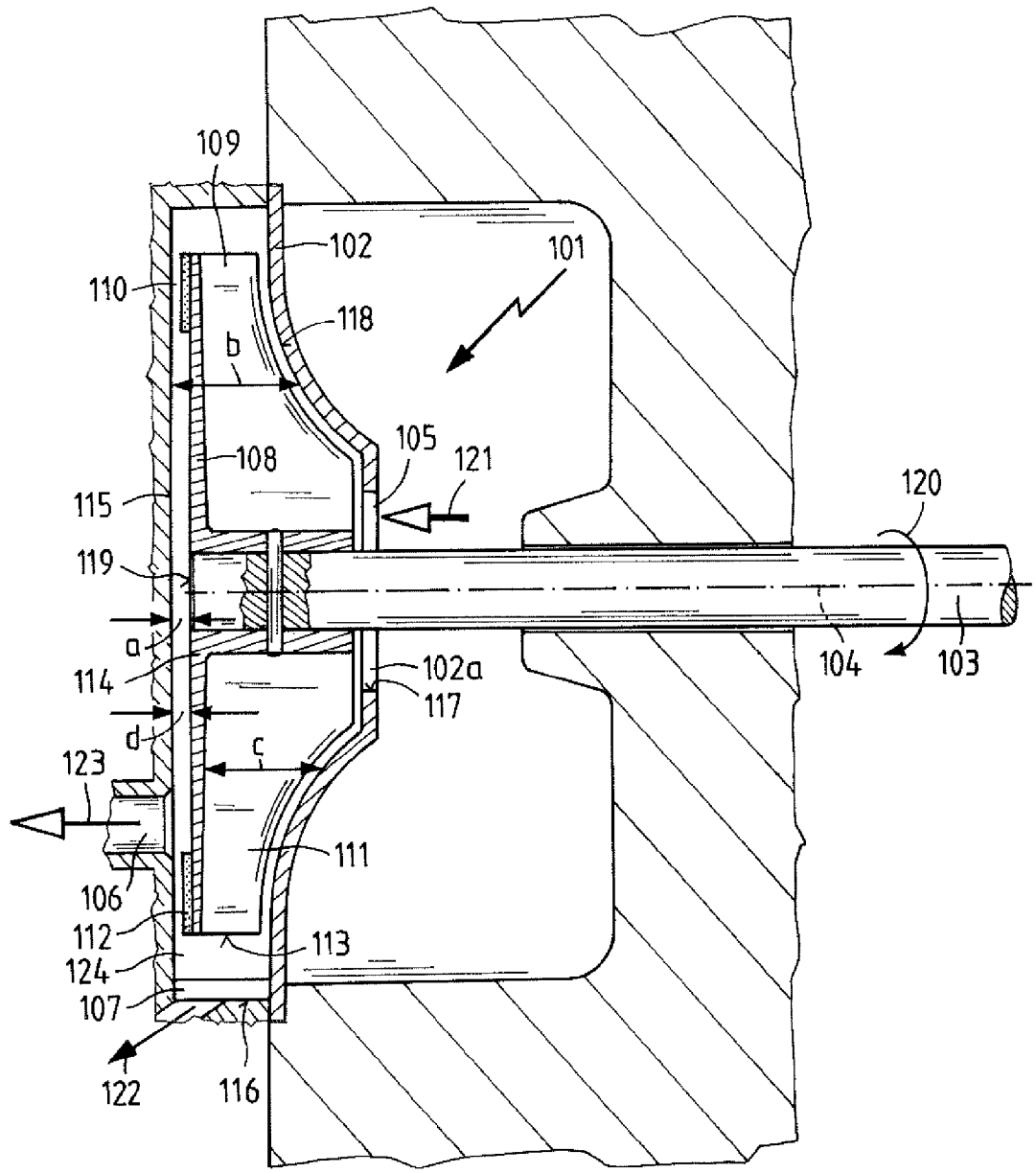
FIG. 2 is a detail illustration of an oil separator that is embodied as a centrifugal separator of the kind illustrated in FIG. 1 for use in a turbocharger.

The centrifugal separator 101 that is shown in detail in FIG. 2 can be advantageously implemented in an exhaust gas turbo charger according to FIG. 1. The centrifugal separator 101 illustrated in FIG. 2 has a housing 102 that is fixedly (non-rotatably) arranged; the housing 102 is in particular the intermediate chamber arranged between turbine wheel and compressor wheel. Optionally, the housing 102 can be formed integrally on the cylinder head of an internal combustion engine. The housing 102 is at least mostly of rotational symmetry relative to the longitudinal axis 104 of a drive shaft 103 on which the centrifugal separator 101 is fixedly mounted. The drive shaft 103 is in particular fixedly connected to the compressor wheel and expediently also fixedly connected to the turbine wheel.

However, an embodiment is also conceivable in which the compressor wheel is not driven by the turbine wheels but by another drive unit, for example, an electric motor, or directly or indirectly driven by the crankshaft of the internal combustion engine. In this case, the compressor wheel and the centrifugal separator 101 are seated fixedly on the shaft 103 that is driven in the manner described above by a drive unit.

The housing 102 of the centrifugal separator 101 has a front wall 118 which is curved in the direction of longitudinal axis 104 of the drive shaft 103. In the front wall 118 of the housing 102, concentrically to the longitudinal axis 104 and to the drive shaft 103, a preferably circular opening 117 is provided through which the drive shaft 103 projects into the housing 102. The opening 117 has a greater diameter than the drive shaft 103 so that between the exterior wall of the drive shaft 103 and the wall of the housing 102 delimiting the opening 117 a circular intermediate space is formed that provides a gas inlet 105. The gas inlet 105 has the function of an inlet through which the separator gases that are not yet purified are introduced into the intermediate chamber or the housing 102 with the centrifugal separator 101 arranged therein.

Within the housing 102 there is a wheel 114 that essentially embodies the centrifugal separator and is fixedly connected to the drive shaft 103. In the area of the shaft end 119, the wheel 114 has a disk-shaped back wall 108 that extends perpendicularly to the longitudinal axis 104 of the drive shaft 103 radially in an outward direction. On the first side of the back wall 108 that is facing the axial gas inlet 105, the wheel 114 has vanes 111 that extend in particular approximately parallel to the longitudinal axis 104 radially in an outward direction and that generate upon rotation of the drive shaft 103 a centrifugal flow. The ends of the vanes 111 facing the front wall 118 of the housing 102 extend preferably parallel to the front wall 118. The dimensions of the back wall 108 and the vanes 111 are matched to one another in such a way that the back wall 108 extends approximately up to the outer circumference 113 of the vanes 111.

On the radially outwardly positioned inner wall 116 of the housing 102 an oil outlet 107 is arranged that is slot-shaped and that extend parallel to the longitudinal axis 104 of the drive shaft 103. Between the radially outwardly positioned inner wall 116 of the housing 102 and the outer circumference 113 of the vanes 111 an annular space 124 is formed.

In the back wall 115 of the housing 102 that is arranged immediately adjacent and parallel to the back wall 108 of the centrifugal separator 101, a gas outlet 106 is provided that represents a connecting opening between the interior of the housing 102 and the adjoining space that is in particular the compressor chamber with compressor wheel arranged therein. By means of gas outlet 106 the purified gases are discharged from the interior of the housing 102.

On the second side 110 of the back wall 108 of the centrifugal separator that is facing the gas outlet 106, the wheel 114 is provided with vanes 112 that are provided in addition to the vanes 111. The vanes 111 are located on the side 109 facing the drive shaft 103 and the vanes 112 are arranged on the opposite side 110 of the back wall 108. The vanes 112 extend in an axial narrow range of the outer circumference 113 of the vanes 111 radially in an inward direction.

Viewed in the radial direction toward the longitudinal axis 104, the gas outlet 106 is arranged inside an area enclosed by the vanes 112 and adjoins in particular in the radial direction immediately the vanes 112. Relative to the longitudinal axis 103 of the drive shaft 104, the gas outlet 106 is arranged radially displaced.

The shaft end 119 of the drive shaft 103 has a radial spacing a relative to the back wall 115 of the housing 102; the back wall 115 is provided also with the gas outlet 106. The drive shaft 103 and the wheel 114 are secured without contact in the housing 102, in particular without a bearing in the housing 102. The width b of the housing 102 decreases, measured in a direction parallel to the longitudinal axis 104 of the drive shaft 103, in the area between the gas inlet 105 and the outer circumference 113 of the vanes 111 in the radial outward direction. This spacing d between the back wall 108 of the wheel 114 and the back wall 115 of the housing 102 is constant, while this spacing c between the back wall 108 of the wheel 114 and the front wall 118 the housing 102 in an area of the back wall 108 decreases in the radial outward direction. The spacing c on the side facing the gas inlet 105 is however greater at any location than the spacing d on the side 110 facing the gas outlet 106.

In operation of the centrifugal separator 101 the drive shaft 103 rotates as indicated by arrow 120 about longitudinal axis 104. Gas to be purified flows in the direction of arrow 121 axially into the housing 102 and into the area of the wheel 114 and is accelerated by rotation of the wheel 114 radially or tangentially in the outward direction. In the annular space 124 between the outer circumference 113 of the vanes 111 and the radially outwardly positioned inner wall 116 of the housing 102, pressure is built up in the gas. In this way, oil is separated from the gas and flows through the oil outlet 107 in the direction of arrow 122 out of the housing 102. The purified gas flows to the side 110 of the back wall 108 facing the gas outlet 106 and from there out of the housing 102 through the axial gas outlet 106 in the direction of arrow 123.

The specification incorporates by reference the entire disclosure of German priority document 10 2007 030 277.2 having a filing date of Jun. 28, 2007.

While specific embodiments of the invention have been shown and described in detail to illustrate the inventive principles, it will be understood that the invention may be embodied otherwise without departing from such principles.

What is claimed is:

1. A compressor in the intake tract of an internal combustion engine, the compressor comprising:
    a housing including a partition wall dividing an interior of said housing into two chambers;
    an elongated rotatable shaft arranged within said housing, said shaft extending through said partition wall into said chambers;
    wherein a first one of said chambers is a compressor chamber;
    wherein a second of said chambers is an intermediate chamber, said intermediate chamber arranged in said housing axially spaced and immediately adjacent to compressor chamber,
    a compressor wheel arranged in the compressor chamber, wherein the compressor wheel is coupled to the shaft;
    wherein the intermediate chamber is separate from the compressor chamber;
    a centrifugal separator wheel arranged in the intermediate chamber and coupled to the shaft;
    wherein the intermediate chamber includes
        an inlet arranged in an outer wall of said housing for supplying separator gases to the centrifugal separator wheel and
        at least one connecting opening extending through said partition from the intermediate chamber to the compressor chamber,
    wherein the centrifugal separator wheel has a radially extending back wall with axially opposing first and second sides,
    wherein the first side is facing away from the compressor chamber,
    wherein the centrifugal separator further comprises a first set of vanes secured to and extending in axial direction outwardly from said first side, said first set of vanes extending radially between said shaft and a radially arranged wall of said intermediate chamber, and wherein a second set of vanes are arranged annularly on said second side of said centrifugal separator wheel and facing said connecting opening, said second set of vanes arranged annularly in an outer circumferential region of said second side of said backwall.

2. The compressor according to claim 1, wherein the at least one connecting opening communicates with an intake side of the compressor wheel.

3. The compressor according to claim 1, wherein the at least one connecting opening and the inlet are positioned on axially opposite sides of the centrifugal separator in walls of the intermediate chamber.

4. The compressor according to claim 1, wherein the inlet is positioned on a side of the centrifugal separator facing away from the compressor wheel.

5. The compressor according to claim 1, wherein the intermediate chamber inlet is arranged on the housing on a radially arranged circumferential outer wall of intermediate chamber, wherein said inlet opens into said intermediate chamber radially relative to said shaft.

6. The compressor according to claim 1, wherein the shaft passes through opposed walls of the immediate chamber.

7. An exhaust gas turbocharger for an internal combustion engine, the turbocharger comprising:
a compressor according to claim 1;
an exhaust gas turbine having a turbine wheel arranged in an exhaust gas manifold and driven by the exhaust gases of the internal combustion engine;
wherein the turbine wheel is connected to the shaft and a rotational movement of the turbine wheel is transmitted by the shaft onto the compressor wheel.

8. The turbocharger according to claim 7, wherein the intermediate chamber and the centrifugal separator arranged therein are positioned between the compressor chamber and a turbine chamber that houses the turbine wheel.

9. A compressor in the intake tract of an internal combustion engine, the compressor comprising:
a housing enclosing three chambers therein;
two axially spaced partition walls dividing an interior of said housing into said three chambers;
an elongated rotatable shaft arranged within said housing, said shaft extending through said partition walls into said three chambers;
wherein a first one of said chambers is a turbine chamber,
wherein a second one of said chambers is a compressor chamber,
wherein a third of said chambers is an intermediate chamber, said intermediate chamber arranged in said housing between said turbine chamber and said compressor chamber;
an exhaust gas turbine having a turbine wheel driven by the exhaust gases of the internal combustion engine,
wherein the turbine wheel is connected to the shaft and a rotational movement of the turbine wheel is transmitted by the shaft onto the compressor wheel;
a compressor wheel arranged in the compressor chamber, wherein the compressor wheel is coupled to the shaft;
wherein the intermediate chamber is separate from the compressor chamber;
a centrifugal separator wheel arranged in the intermediate chamber and coupled to the shaft;
wherein the intermediate chamber includes
an inlet for supplying separator gases to the centrifugal separator and
at least one connecting opening extending through a first one of said partitions, said at least one connecting opening connecting the intermediate chamber to the compressor chamber delivering purified gases from said intermediate chamber to said compressor chamber through said first one of said partition walls,
wherein a second one of said partition walls is pressure tight, separating and isolating said intermediate chamber from said turbine chamber, wherein said housing and second partition wall pressure and flow isolates said turbine chamber from said intermediate chamber, said pressure isolation preventing gases from passing between said intermediate chamber and said turbine chamber.

10. The compressor according to claim 9, wherein
wherein the centrifugal separator wheel has a radially extending back wall with axially opposing first and second sides,
wherein the first side is facing away from the compressor chamber,
wherein the centrifugal separator further comprises a first set of vanes secured to and extending in axial direction outwardly from said first side, said first set of vanes extending radially between said shaft and a radially arranged wall of said intermediate chamber, and
wherein a second set of vanes are arranged annularly on said second side of said centrifugal separator wheel and facing said connecting opening, said second set of vanes arranged annularly in an in outer circumferential region of said second side of said centrifugal separator wheel.

* * * * *